UNITED STATES PATENT OFFICE.

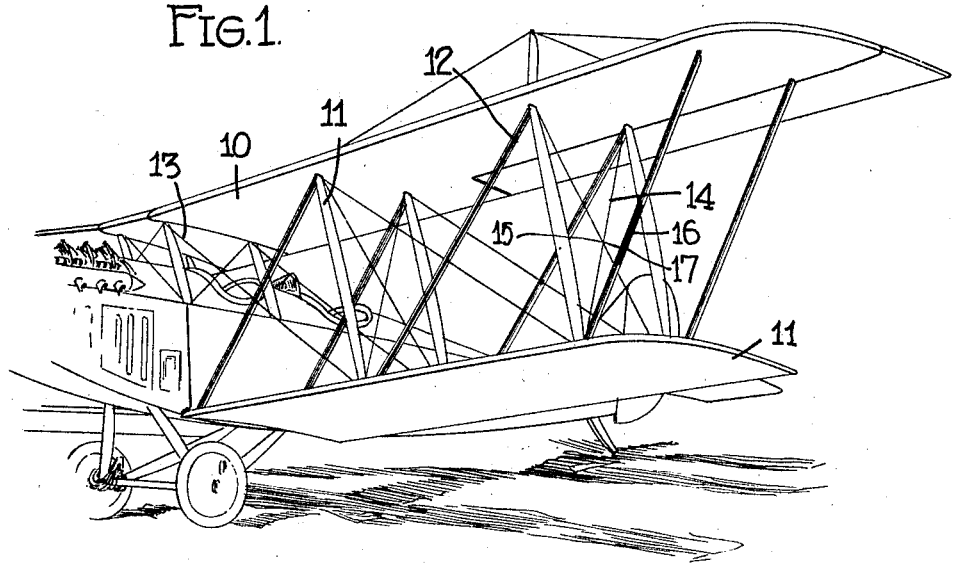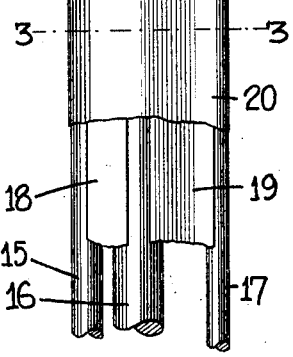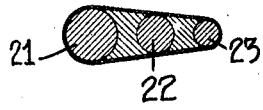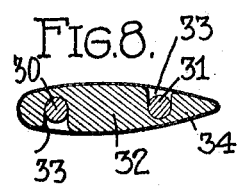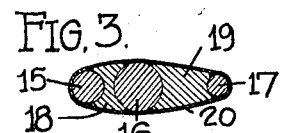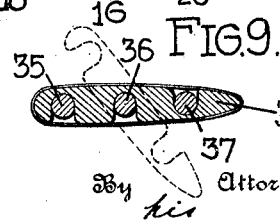

GLENN H. CURTISS, OF GARDEN CITY, NEW YORK, ASSIGNOR TO CURTISS AEROPLANE AND MOTOR CORPORATION, A CORPORATION OF NEW YORK.

STREAM-LINE WIRING FOR AIRPLANES.

1,392,271. Specification of Letters Patent. Patented Sept. 27, 1921.

Application filed May 4, 1918. Serial No. 232,487.

*To all whom it may concern:*

Be it known that I, GLENN H. CURTISS, a citizen of the United States, residing at Garden City, in the county of Nassau and State of New York, have invented certain new and useful Improvements in Stream-Line Wiring for Airplanes, of which the following is a specification.

My invention relates to airplane wiring and more particularly to what may be designated "streamline wiring" although wiring of the conventional cross section is used.

Actual streamline wiring has heretofore been proposed and used to advantage in so far as enhancing the operating efficiency of the machine is concerned. The production cost of such wiring however prevents its commercialization. Its manufacture requires a special and costly process hardly commensurate with the advantages resulting from its use. The present invention aims to eliminate this high production cost without adding greatly to the size of the wiring or adding in the least to its resistance in the air. Instead of making the wire itself of streamline section, two or more wire lengths are used, each of ordinary section. These wires, by the use of fairing, are streamlined as a unit in a manner such that they present to the eye of the casual observer a single length of wiring of true streamline form. For betterment of form and resulting decrease in resistance it is preferred that wire lengths of different gage be used and arranged one behind the other. The larger of the wire lengths is disposed foremost for the reason that the entering edge should be comparatively blunt while the trailing edge should be tapering. The different size wire lengths are then wrapped together and an approximate streamline form given the wiring or fairing is arranged between the wire lengths (and if desired, in advance of the leading wire and to the rear of the trailing wire) to give the wiring a true streamline section. In either event the idea is the same. Where wires of successively decreasing gage are used the wires may be arranged with the large wire foremost or with the large wire intermediately located. In either instance an approximate streamline form is given the wiring. Other arrangements of wires may be used as hereinafter mentioned, since it is the aim of this invention to produce streamline wiring by the use of separate wire lengths of standard cross section rather than of special cross section as heretofore.

Of the drawings:—

Figure 1 is a perspective view (more or less diagrammatic) of an airplane equipped with stream line wiring of the character disclosed;

Fig. 2 is a detail side elevation of a section of the wiring showing the arrangement of the wire lengths, fairing and wrapping;

Fig. 3 is a section on the line 3—3 of Fig. 2;

Figs. 4 to 7 inclusive are detail sectional views (similar to Fig. 3) showing modified types of wiring; and Figs. 8 and 9 are sectional views showing modified types of fairing.

Referring to Fig. 1 the supporting surfaces are designated as 10. They are interconnected by wing posts 11 and wiring, stagger, lift and drop wires being used. The lift wires have been designated as 12, the drop wires as 13 and the stagger wires as 14. Since the lift wires carry the greater load, they alone have been shown as the streamline form and they alone will be hereinafter described. The other wires however (both stagger and drop) may be similarly streamlined although duplicate wiring is more essential for carrying the lift load than for carrying the landing load and preventing distortion of the wings.

In Fig. 2, three wire lengths are used. The lift wires designated respectively 15, 16 and 17 are of different gage and of the conventional form in transverse section. 16 designates the largest wire of the three. It is intermediately located although nearer the leading edge than the trailing edge for the reason that maximum width is best provided at this point. The smaller or trailing wire 17 is preferably more distantly removed from the intermediate or large wire 16 than the leading wire 15 to carry out the streamline form. The wire lengths extend parallel and are commonly anchored preferably to fittings suitably constructed and provided at the wing post ends.

Between the wire lengths fairing strips 18 and 19 are arranged, each strip being longitudinally grooved or channeled to complement the wire lengths as indicated in Fig. 3. These strips hold the wire lengths apart and prevent sagging of the wrapping 20 which incloses the three wires so that they may be streamlined together. Fabric is preferably used as wrapping although other material may be used if desired. When wrapped about the wiring the fabric is doped in the usual manner to strengthen it, render it water-tight and reduce skin friction, while the machine is in the air. As the fairing and wiring inclosed will hold it in shape obviously the finished wiring will be of approximate streamline form.

In Figs. 4, 5, 6 and 7 different arrangements of wires are shown. In Fig. 4, three wire lengths are used, each wire length being of different gage with the largest wire located ahead. In Fig. 5 but two wire lengths are used. In this case fairing is arranged between the two wire lengths and in advance of the leading wire to enhance the streamline of the wiring as a whole. Fig. 6 discloses an arrangement exactly like Fig. 5 except that the advance fairing is eliminated. It is cheaper, although not of quite so good streamline form. In Fig. 7 the wire lengths are of the same gage while the fairing arranged between them is given an approximate streamline form for obvious reasons. Any one of these arrangements may be used with facility and without greatly increasing the manufacturing cost of the machine. By using two or more lengths of wire and streamlining them as a unit the factor of safety may be increased (in fact doubled or tripled) while the head resistance is increased but little if at all. The wires in Fig. 4, have been designated as 21, 22 and 23, the wires in Fig. 5 as 24 and 25, the wires in Fig. 6 as 26 and 27, and the wires in Fig. 7 as 28 and 29. In each instance the multiple number of wires is wrapped and the fairing made to complement the wires as pointed out in connection with the showing of Figs. 2 and 3.

In Figs. 8 and 9 wire of the same gage is used. Fig. 8 shows two wire lengths 30 and 31 with fairing 32 arranged between them. The fairing is longitudinally grooved upon its opposite faces as at 33 to receive the wire lengths and then wrapped as indicated at 34 that the grooves may be hidden or removed from view. The wrapping 34 eliminates what would be a break in the continuity of the fairing surface while the fairing itself streamlines the two wires perfectly and as a unit. In Fig. 9, three wire lengths 35, 36 and 37 are used. Fairing 38 of the same character is also provided. The fairing 38, however, is thrice notched, two of the notches facing one way and one the other. The central notch or the notch within which the wire 36 is inclosed is so arranged that the said central or intermediate wire 36 may act as a fulcrum in arranging the fairing in place. The fairing is slipped between two of the wires and the wire 36 slipped into the central notch. The fairing is then given a fractional turn until the wires 26 and 27 are inclosed within their respective notches whereupon the fairing is wrapped in much the same manner set forth when referring to Fig. 8.

In each of the above types of streamline wiring, wire lengths of ordinary construction are used. They are preferably however of different gage and arranged one behind the other (the smaller wire being rearwardly disposed) to better the streamline form. In each instance the wires are streamlined as a unit and in each instance fairing and wrapping is used.

While I have described my invention in detail in its present preferred embodiment, it will be obvious to those skilled in the art after understanding my invention, that various charges and modifications may be made therein without departing from the spirit or scope thereof. I aim in the appended claims to cover all such modifications and changes.

What is claimed is:

1. Airplane wiring including two wires of different gage, the wires being arranged one behind the other with the wire of larger gage in front, and fairing between the wires for spacing them, the fore and aft longitudinal edges of the fairing being grooved to complement the wires and the cross sectional shape of the fairing being such that the wires and fairing together approximate a streamline form.

2. Streamline airplane wiring including separate flexible wires arranged one behind the other and in parallelism, fairing between the wires for spacing them apart, the fairing being grooved longitudinally to complement the wires, and a fabric wrapping for holding the fairing and wires together.

3. Streamline airplane wiring including two flexible wires of different gage, the wires being arranged one behind the other with the wire of larger gage in front, fabric wrapping for holding the wires together, the wrapping constituting the only means whereby the wires are streamlined as a unit and fairing between the wires to prevent sagging of the fabric wrapping due to bending of the wires.

4. Airplane wiring including adjacent wires, fairing between the wires, the fairing being provided with longitudinal grooves within which the wires are fitted and the wires and fairing being so relatively arranged that adjacent wires are streamlined as a unit and at the same time given an approximate streamline form, and wrapping for the wires and fairing, the wrapping between the wires being prevented from sagging by the fairing.

5. Airplane wiring including adjacent flexible wires of different gage, the wires being arranged one behind the other and parallel with the wire of larger gage in front, wood fairing for the wiring intermediately located between the wires and grooved longitudinally to receive adjacent edges thereof, and fabric wrapping for the wiring completely inclosing both the wires and the fairing to streamline them as a unit.

In testimony whereof I hereunto affix my signature.

GLENN H. CURTISS.